United States Patent
Ueyama (10) Patent No.: US 11,701,923 B2
(45) Date of Patent: Jul. 18, 2023

(54) TIRE

(71) Applicant: SUMITOMO RUBBER INDUSTRIES, LTD., Hyogo (JP)

(72) Inventor: Kiyotaka Ueyama, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 345 days.

(21) Appl. No.: 16/737,087

(22) Filed: Jan. 8, 2020

(65) Prior Publication Data

US 2020/0223261 A1 Jul. 16, 2020

(30) Foreign Application Priority Data

Jan. 15, 2019 (JP) .............................. JP2019-004578

(51) Int. Cl.
*B60C 11/03* (2006.01)
*B60C 11/12* (2006.01)

(52) U.S. Cl.
CPC ...... *B60C 11/0304* (2013.01); *B60C 11/1236* (2013.01); *B60C 2011/0353* (2013.01);
(Continued)

(58) Field of Classification Search
CPC ............. B60C 11/0304; B60C 11/1236; B60C 11/0302; B60C 11/03; B60C 2011/0372;
(Continued)

(56) References Cited

U.S. PATENT DOCUMENTS

2005/0247388 A1* 11/2005 Ohsawa .............. B60C 11/0083
73/146
2010/0200134 A1* 8/2010 Murata ............... B60C 11/0304
152/209.8
(Continued)

FOREIGN PATENT DOCUMENTS

EP 3015286 A1 * 5/2016 ......... B60C 11/0304
JP 2009-040156 2/2009
(Continued)

*Primary Examiner* — Cedrick S Williams
(74) *Attorney, Agent, or Firm* — Greenblum & Bernstein P.L.C.

(57) ABSTRACT

A tread portion has an outer tread end that is positioned on an outer side of a vehicle when mounted to the vehicle, a plurality of circumferential grooves that extend continuously in a tire circumferential direction, and a plurality of land portions that are defined by the circumferential grooves. The circumferential grooves include an outer circumferential groove that extends adjacently to a tire equator in a region closer to the outer tread end than the tire equator is. The land portions include an outer shoulder land portion that is defined between the outer circumferential groove and the outer tread end so as to continuously extend therebetween in a tire axial direction, and that has the largest width in the tire axial direction among the land portions. The outer shoulder land portion has a first outer lateral groove that extends inward in the tire axial direction and terminates in the outer shoulder land portion. An angle of the first outer lateral groove relative to the tire axial direction at a terminating position in the outer shoulder land portion is 0 to 20°.

17 Claims, 4 Drawing Sheets

(52) U.S. Cl.
CPC ................ *B60C 2011/0365* (2013.01); *B60C 2011/0372* (2013.01)

(58) Field of Classification Search
CPC ..... B60C 2011/0386; B60C 2011/0388; B60C 2011/039
See application file for complete search history.

(56) References Cited

U.S. PATENT DOCUMENTS

| | | | | |
|---|---|---|---|---|
| 2016/0167443 | A1* | 6/2016 | Inoue | B60C 11/0306 152/209.8 |
| 2016/0257172 | A1* | 9/2016 | Mukai | B60C 11/1315 |
| 2018/0215205 | A1* | 8/2018 | Maeda | B60C 11/0302 |
| 2018/0319219 | A1* | 11/2018 | Oba | B60C 11/0332 |
| 2019/0009615 | A1* | 1/2019 | Tatsuta | B60C 11/042 |

FOREIGN PATENT DOCUMENTS

| | | | | | |
|---|---|---|---|---|---|
| JP | | 4729096 | B2 * | 7/2011 | |
| JP | | 5250063 | B2 * | 7/2013 | ............ B60C 11/03 |
| KR | 10-0879384 | B1 * | 1/2009 | |
| KR | | 879384 | B1 * | 1/2009 | |

* cited by examiner

TIRE

BACKGROUND OF THE INVENTION

Field of the Invention

The present invention relates to a tire including a tread portion that has an asymmetric tread pattern and that has a designated mounting direction to a vehicle.

Description of the Background Art

To date, various tires each including a tread portion that has an asymmetric tread pattern and that has a designated mounting direction to a vehicle, have been known. For example, Japanese Laid-Open Patent Publication No. 2009-040156 suggests a tire in which an outer shoulder region is formed as outer block rows by tilted outer main grooves that extend transversely across the outer shoulder region between a ground contact edge and a longitudinal main groove in an outer side region disposed on the outer side of the vehicle.

In the tire disclosed in Japanese Laid-Open Patent Publication No. 2009-040156, achievement of both dry grip performance and wet performance is attempted by three longitudinal main grooves being disposed and stiffness being improved in the outer shoulder region. However, in the tire disclosed in Japanese Laid-Open Patent Publication No. 2009-040156, input from a road surface is increased according to the improvement of the stiffness of the tread portion, so that a problem that ride comfort is degraded may arise.

The present invention has been made in view of the aforementioned circumstances, and a main object of the present invention is to provide a tire that allows achievement of both steering stability and ride comfort.

SUMMARY OF THE INVENTION

The present invention is directed to a tire that includes a tread portion which has an asymmetric tread pattern and which has a designated mounting direction to a vehicle. The tread portion has an outer tread end that is positioned outward of a tire equator on an outer side of the vehicle when mounted to the vehicle, an inner tread end that is positioned inward of the tire equator on an inner side of the vehicle when mounted to the vehicle, a plurality of circumferential grooves that extend continuously in a tire circumferential direction, and a plurality of land portions that are defined by the circumferential grooves. The circumferential grooves include an outer circumferential groove that extends adjacently to the tire equator in a region closer to the outer tread end than the tire equator is. The land portions include an outer shoulder land portion that is defined between the outer circumferential groove and the outer tread end so as to continuously extend therebetween in a tire axial direction, and that has the largest width in the tire axial direction among the land portions. The outer shoulder land portion has a first outer lateral groove that extends inward from the outer tread end in the tire axial direction and terminates in the outer shoulder land portion. An angle of the first outer lateral groove relative to the tire axial direction at a terminating position in the outer shoulder land portion is 0 to 20°.

In the tire of the present invention, the circumferential grooves preferably include a first inner circumferential groove that extends adjacently to the inner tread end in a region closer to the inner tread end than the tire equator. The land portions preferably include an inner shoulder land portion that is defined between the first inner circumferential groove and the inner tread end, and does not have grooves and sipes that extend continuously in the tire circumferential direction and grooves that extend transversely in the tire axial direction. The inner shoulder land portion preferably has an inner lateral groove that extends inward from the inner tread end in the tire axial direction and terminates in the inner shoulder land portion.

In the tire of the present invention, the circumferential grooves preferably include a second inner circumferential groove that extends adjacently to the tire equator in a region closer to the inner tread end than the tire equator. The land portions preferably include a crown land portion that is defined between the outer circumferential groove and the second inner circumferential groove. In the crown land portion, a first length L1, in the tire axial direction, of a region closer to the outer circumferential groove than the tire equator is preferably greater than a second length L2, in the tire axial direction, of a region closer to the second inner circumferential groove than the tire equator.

In the tire of the present invention, a difference (L1−L2) between the first length L1 and the second length L2 is preferably 20% to 80% of a width Wc of the crown land portion.

In the tire of the present invention, a width Wo of the outer shoulder land portion is preferably 25% to 40% of a tread width between the outer tread end and the inner tread end.

In the tire of the present invention, a length Lo1, in the tire axial direction, of the first outer lateral groove is preferably 40% to 60% of the width Wo of the outer shoulder land portion.

In the tire of the present invention, the outer shoulder land portion preferably has a second outer lateral groove that extends outward from the outer circumferential groove in the tire axial direction and terminates in the outer shoulder land portion.

In the tire of the present invention, a length Lo2, in the tire axial direction, of the second outer lateral groove is preferably 25% to 75% of a difference (Wo−Lo1) between the width Wo of the outer shoulder land portion and the length Lo1, in the tire axial direction, of the first outer lateral groove.

In the tire of the present invention, the circumferential grooves preferably include a second inner circumferential groove that extends adjacently to the tire equator in a region closer to the inner tread end than the tire equator. The land portions preferably include a crown land portion that is defined between the outer circumferential groove and the second inner circumferential groove. The crown land portion preferably includes a first crown lateral groove that extends inward from the outer circumferential groove in the tire axial direction, and terminates in the crown land portion. An opening of the first crown lateral groove to the outer circumferential groove is preferably disposed on an extension of the second outer lateral groove.

In the tire of the present invention, the circumferential grooves include the outer circumferential groove that extends adjacently to the tire equator in a region closer to the outer tread end than the tire equator, and the land portions include the outer shoulder land portion that is defined between the outer circumferential groove and the outer tread end so as to continuously extend therebetween in the tire axial direction, and has the largest width in the tire axial direction among the land portions. The land portions having such a structure can allow stiffness to become high on the outer side of the vehicle, allow cornering power during cornering to be improved, and allow steering stability to be improved by the tire.

In the tire of the present invention, the outer shoulder land portion has the first outer lateral groove that extends inward from the outer tread end in the tire axial direction and terminates in the outer shoulder land portion. An angle of the first outer lateral groove relative to the tire axial direction at a terminating position in the outer shoulder land portion is 0 to 20°. The outer shoulder land portion having such a structure can allow input from a road surface to be regulated by the first outer lateral groove while maintaining stiffness, and allow ride comfort to be improved by the tire. Therefore, the tire of the present invention can allow both steering stability and ride comfort to be achieved.

DESCRIPTION OF THE PREFERRED EMBODIMENTS

One embodiment of the present invention will be described below in detail with reference to the drawings.

Figure 1:
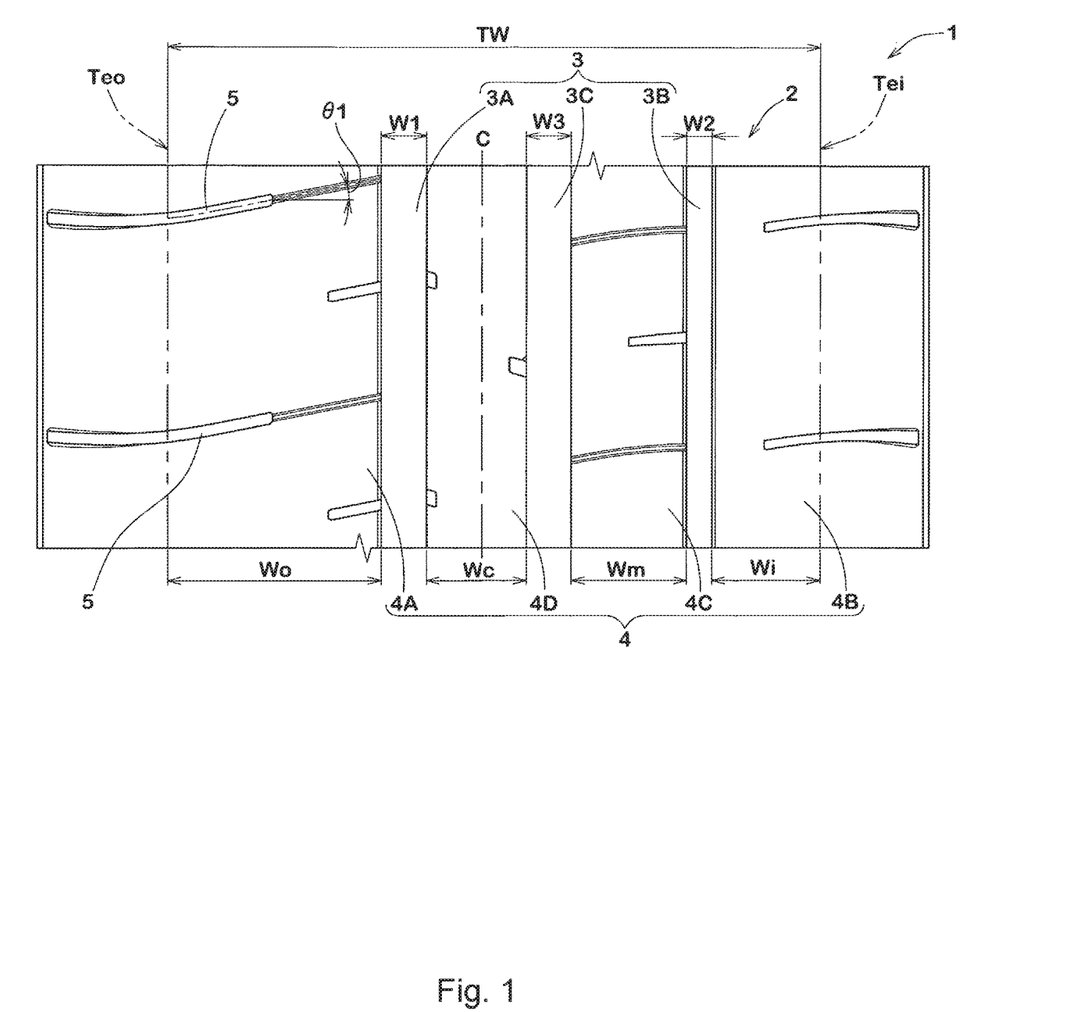
FIG. 1 is a development of a tread portion of a tire according to one embodiment of the present invention.

FIG. 1 is a development of a tread portion 2 of a tire 1 according to the present embodiment. As shown in FIG. 1, the tire 1 of the present embodiment includes the tread portion 2 which has an asymmetric tread pattern and which has a designated mounting direction to a vehicle.

The tire 1 is preferably used as, for example, a pneumatic tire for a passenger car. The tire 1 is not limited to a pneumatic tire for a passenger car. The tire 1 can be used as various tires including, for example, a heavy duty pneumatic tire and a non-pneumatic tire which is not filled with pressurized air.

The tread portion 2 of the present embodiment includes an outer tread end Teo that is positioned outward of a tire equator C on the outer side of a vehicle when the tire 1 is mounted to the vehicle, and an inner tread end Tei that is positioned inward of the tire equator C on the inner side of the vehicle when the tire 1 is mounted to the vehicle.

In the description herein, the "outer tread end Teo" and the "inner tread end Tei" are tire-axially outermost ground contact positions in the case of the tire 1 in a normal state being in contact with a plane at a camber angle of 0° under a normal load. The center position, in the tire axial direction, between the outer tread end Teo and the inner tread end Tei is the tire equator C.

The "normal state" represents a state in which the tire 1 is mounted on a normal rim and is inflated with air to a normal internal pressure, and no load is applied to the tire 1 when the tire 1 is a pneumatic tire. In the description herein, unless otherwise specified, dimensions of components of the tire 1, and the like are represented as values measured in the normal state.

The "normal rim" represents a rim that is defined by a standard, in a standard system including the standard with which the tire 1 complies, for each tire, and is, for example, the "standard rim" in the JATMA standard, the "Design Rim" in the TRA standard, or the "Measuring Rim" in the ETRTO standard.

The "normal internal pressure" represents an air pressure that is defined by a standard, in a standard system including the standard with which the tire 1 complies, for each tire, and is the "maximum air pressure" in the JATMA standard, the maximum value recited in the table "TIRE LOAD LIMITS AT VARIOUS COLD INFLATION PRESSURES" in the TRA standard, or the "INFLATION PRESSURE" in the ETRTO standard.

The "normal load" represents a load that is defined by a standard, in a standard system including the standard with which the tire 1 complies, for each tire, and is "maximum load capacity" in the JATMA standard, the maximum value recited in the table "TIRE LOAD LIMITS AT VARIOUS COLD INFLATION PRESSURES" in the TRA standard, or the "LOAD CAPACITY" in the ETRTO standard.

The tread portion 2 preferably includes a plurality of circumferential grooves 3 that extend continuously in the tire circumferential direction, and a plurality of land portions 4 that are defined by the circumferential grooves 3. In the present embodiment, each of the plurality of land portions 4 does not have grooves and sipes that extend continuously in the tire circumferential direction and grooves that extend transversely in the tire axial direction. The land portions 4 having such a structure has a high stiffness and can allow steering stability to be improved by the tire 1. In the description herein, the sipe has opposing wall surfaces that are brought into contact with each other when the tire 1 contacts with the ground, and the groove forms a gap between opposing wall surfaces also when the tire 1 contacts with the ground.

The circumferential grooves 3 of the present embodiment include one outer circumferential groove 3A that extends adjacently to the tire equator C in a region closer to the outer tread end Teo than the tire equator C is. In the tread portion 2 of the present embodiment, only the outer circumferential groove 3A is a groove that extends continuously in the tire circumferential direction in a region closer to the outer tread end Teo than the tire equator C. The circumferential grooves 3 having such a structure can allow a preferable drainage performance to be assured and allow wet performance of the tire 1 to be improved.

The land portions 4 of the present embodiment include an outer shoulder land portion 4A that extends continuously in the tire axial direction and is defined between the outer circumferential groove 3A and the outer tread end Teo. That is, the outer shoulder land portion 4A does not have grooves and sipes that extend continuously in the tire circumferential direction. The outer shoulder land portion 4A preferably has the largest width in the tire axial direction among the land portions 4. The land portions 4 having such a structure can allow stiffness to become high on the outer side of the vehicle and allow cornering power during cornering to be improved, and thus allow steering stability to be improved by the tire 1.

The outer shoulder land portion 4A preferably has first outer lateral grooves 5 that extend inward from the outer tread end Teo in the tire axial direction, and terminate in the outer shoulder land portion 4A. The outer shoulder land portion 4A having such a structure can allow a groove volume of each first outer lateral groove 5 to be reduced, allow pattern noise during rolling to be lowered, and allow noise performance of the tire 1 to be improved.

An angle $\theta1$ of the first outer lateral groove 5 relative to the tire axial direction at a terminating position in the outer shoulder land portion 4A is preferably 0 to 20°. The first outer lateral groove 5 having such a structure can allow input from a road surface to be regulated while maintaining stiffness of the outer shoulder land portion 4A, and allow ride comfort to be improved by the tire 1. Therefore, the tire 1 of the present embodiment can allow achievement of both steering stability and ride comfort.

In a more preferable mode, the circumferential grooves 3 include a first inner circumferential groove 3B that extends adjacently to the inner tread end Tei in a region closer to the inner tread end Tei than the tire equator C, and a second inner circumferential groove 3C that extends adjacently to the tire equator C in a region closer to the inner tread end Tei than the tire equator C. The tread portion 2 having such a structure has two inner circumferential grooves disposed inward of the tire equator C on the inner side of the vehicle. Therefore, drainage performance is favorable on the inner side of the vehicle, and wet performance of the tire 1 can be further improved.

A groove width W1 of the outer circumferential groove 3A and a groove width W3 of the second inner circumferential groove 3C are preferably each greater than a groove width W2 of the first inner circumferential groove 3B. The circumferential grooves 3 having such a structure can allow drainage performance around the tire equator C to become good and allow achievement of both drainage performance and stiffness of the tread portion 2. Therefore, the tire 1 of the present embodiment allows achievement of both wet performance and steering stability.

The groove width W1 of the outer circumferential groove 3A is preferably 4% to 10% of a tread width TW. The outer circumferential groove 3A having such a structure can allow achievement of both stiffness and drainage performance on the outer side of the vehicle, and allow achievement of both steering stability and wet performance of the tire 1. The tread width TW is a distance in the tire axial direction between the outer tread end Teo and the inner tread end Tei in the normal state.

The groove width W2 of the first inner circumferential groove 3B is preferably 2% to 8% of the tread width TW. The groove width W3 of the second inner circumferential groove 3C is preferably 4% to 10% of the tread width TW. The first inner circumferential groove 3B and the second inner circumferential groove 3C having such structures can allow achievement of both stiffness and drainage performance on the inner side of the vehicle and allow achievement of both steering stability and wet performance of the tire 1.

The land portions 4 of the present embodiment include an inner shoulder land portion 4B that is defined between the first inner circumferential groove 3B and the inner tread end Tei, and that does not have grooves and sipes that extend continuously in the tire circumferential direction and grooves that extend transversely in the tire axial direction. Furthermore, the land portions 4 preferably include a middle land portion 4C that is defined between the first inner circumferential groove 3B and the second inner circumferential groove 3C, and a crown land portion 4D that is defined between the outer circumferential groove 3A and the second inner circumferential groove 3C. Each of the outer shoulder land portion 4A, the middle land portion 4C, and the crown land portion 4D of the present embodiment does not have grooves and sipes that extend continuously in the tire circumferential direction, and grooves that extend transversely in the tire axial direction. The land portions 4 having such a structure have a high stiffness and can allow steering stability to be improved by the tire 1.

A width Wo, in the tire axial direction, of the outer shoulder land portion 4A is preferably greater than a width Wi, in the tire axial direction, of the inner shoulder land portion 4B, a width Wm, in the tire axial direction, of the middle land portion 4C, and a width Wc, in the tire axial direction, of the crown land portion 4D. The outer shoulder land portion 4A having such a structure can allow stiffness to become high on the outer side of the vehicle, allow cornering power during cornering to be improved, and allow steering stability to be further improved by the tire 1.

The width Wo of the outer shoulder land portion 4A is preferably 25% to 40% of the tread width TW. When the width Wo is less than 25% of the tread width TW, stiffness is reduced on the outer side of the vehicle, and steering stability may not be improved by the tire 1. When the width Wo is greater than 40% of the tread width TW, stiffness becomes excessively high on the outer side of the vehicle, and ride comfort provided by the tire 1 may be degraded.

The width Wi of the inner shoulder land portion 4B is preferably 11% to 22% of the tread width TW. The width Wm of the middle land portion 4C is preferably 12% to 24% of the tread width TW. The inner shoulder land portion 4B and the middle land portion 4C having such structures can allow stiffness on the inner side of the vehicle to be maintained in an appropriate range, and allow both steering stability and ride comfort to be achieved by the tire 1.

The width Wc of the crown land portion 4D is preferably 10% to 20% of the tread width TW. The crown land portion 4D having such a structure can allow stiffness near the tire equator C to be maintained in an appropriate range, and allow both steering stability and ride comfort to be achieved by the tire 1.

Figure 2:
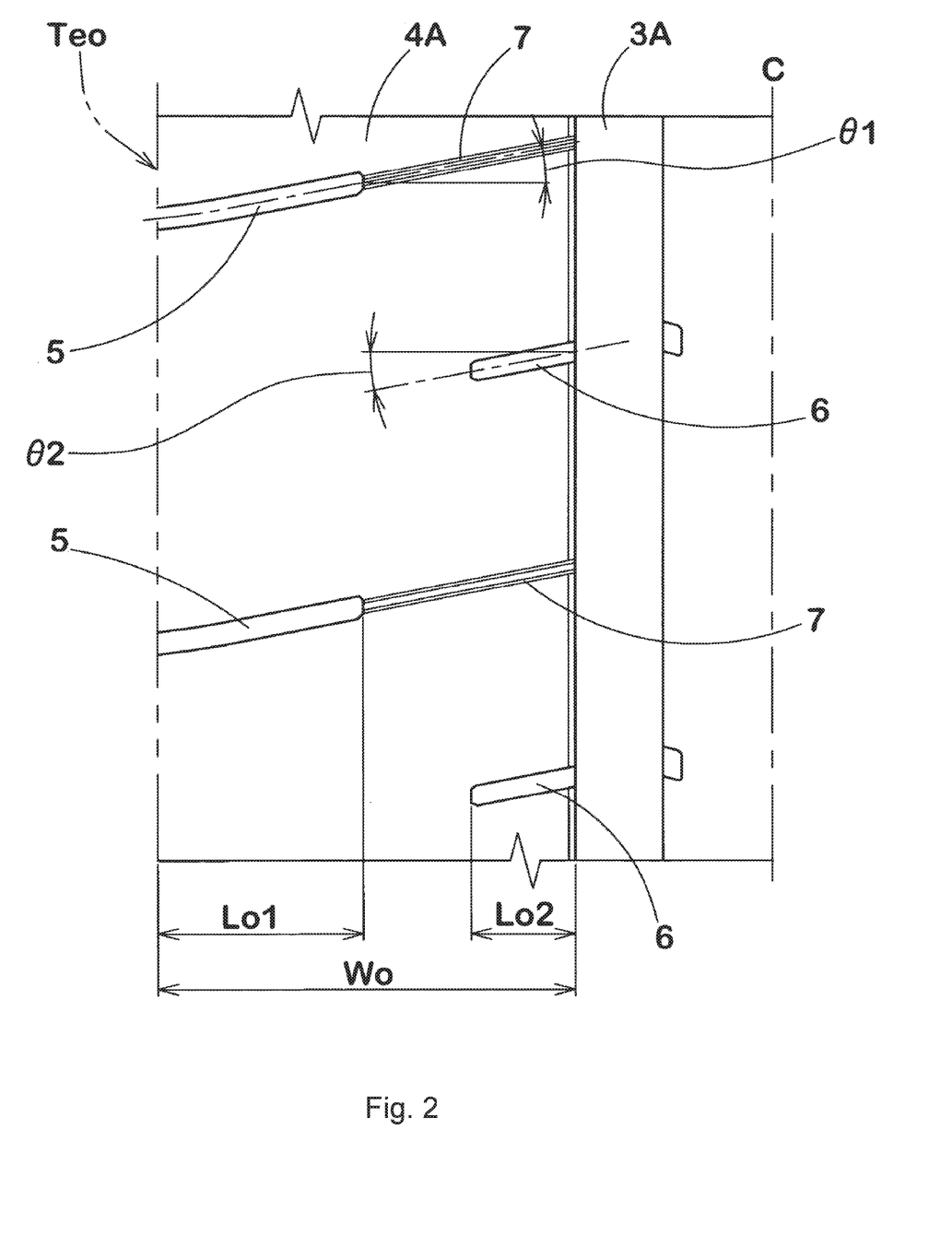
FIG. 2 is an enlarged development of an outer shoulder land portion.

FIG. 2 is an enlarged development of the outer shoulder land portion 4A. As shown in FIG. 2, a length Lo1, in the tire axial direction, of each first outer lateral groove 5 is preferably 40% to 60% of the width Wo of the outer shoulder land portion 4A. When the length Lo1 is less than 40% of the width Wo, stiffness of the outer shoulder land portion 4A becomes excessively high, and ride comfort provided by the tire 1 may be degraded. When the length Lo1 is greater than 60% of the width Wo, stiffness of the outer shoulder land portion 4A is reduced and a groove volume is increased, so that steering stability and noise performance may not be improved by the tire 1.

The outer shoulder land portion 4A of the present embodiment has a second outer lateral groove 6 that extends outward from the outer circumferential groove 3A in the tire axial direction and terminates in the outer shoulder land portion 4A. The outer shoulder land portion 4A having such a structure can allow stiffness to become appropriate, and allow well-balanced improvement of steering stability, ride comfort, and noise performance.

A length Lo2, in the tire axial direction, of each second outer lateral groove 6 is preferably 25% to 75% of a difference (Wo−Lo1) between the width Wo of the outer shoulder land portion 4A and the length Lo1, in the tire axial direction, of the first outer lateral groove 5. When the length Lo2 is less than 25% of the difference (Wo−Lo1), stiffness of the outer shoulder land portion 4A cannot be regulated, and ride comfort may not be improved by the tire 1. When the length Lo2 is greater than 75% of the difference (Wo−Lo1), stiffness of the outer shoulder land portion 4A is reduced and the groove volume is increased, so that steering stability and noise performance may not be improved by the tire 1.

An angle θ2 of the second outer lateral groove 6 relative to the tire axial direction is preferably 0 to 20°. The angle θ2 of the second outer lateral groove 6 is preferably almost equal to the angle θ1 of the first outer lateral groove 5. The second outer lateral groove 6 having such a structure and the first outer lateral groove 5 can allow stiffness of the outer shoulder land portion 4A to be in an appropriate range, and allow well-balanced improvement of steering stability, ride comfort, and noise performance to be achieved by the tire 1.

The outer shoulder land portion 4A of the present embodiment has outer sipes 7 that connect between the first outer lateral grooves 5 and the outer circumferential groove 3A. For example, the outer sipes 7 extend linearly. Each outer ripe 7 preferably extends at an angle equal to the angle θ1 relative to the tire axial direction, at the terminating position in the outer shoulder land portion 4A. The outer sipes 7 having such a structure can allow stiffness of the outer shoulder land portion 4A to be in an appropriate range, and allow both steering stability and ride comfort to be achieved by the tire 1.

Figure 3:
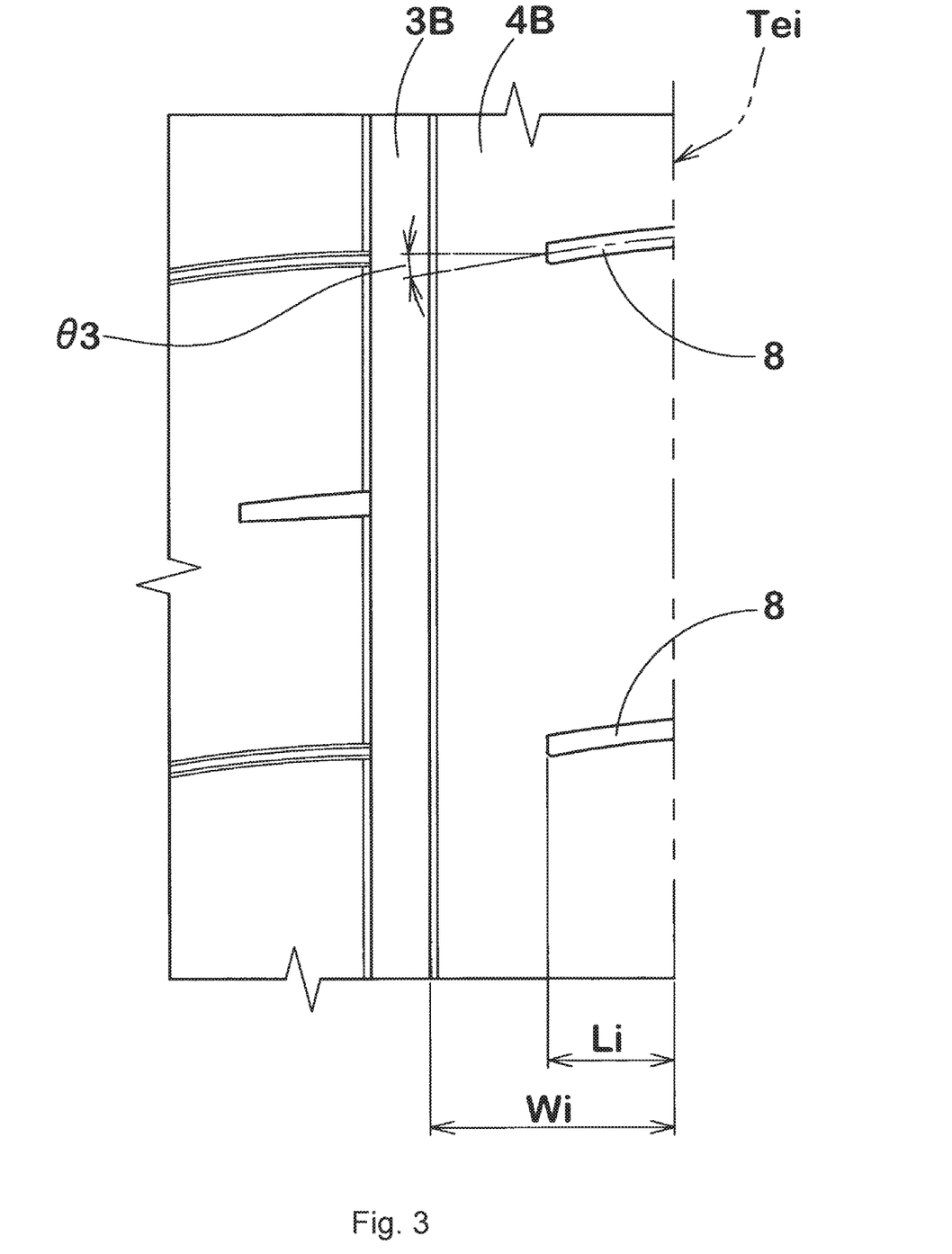
FIG. 3 is an enlarged development of an inner shoulder land portion.

FIG. 3 is an enlarged development of the inner shoulder land portion 4B. As shown in FIG. 3, the inner shoulder land portion 4B preferably has inner lateral grooves 8 that extend inward from the inner tread end Tei in the tire axial direction and terminate in the inner shoulder land portion 4B. The inner lateral groove 8 having such a structure has a small groove volume and can allow pattern noise during rolling to be lowered, thereby allowing noise performance of the tire 1 to be improved.

A length Li, in the tire axial direction, of each inner lateral groove 8 is preferably 50% to 70% of the width Wi of the inner shoulder land portion 4B. When the length Li is less than 50% of the width Wo, stiffness of the inner shoulder land portion 4B becomes excessively high, and ride comfort provided by the tire 1 may be degraded. When the length Li is greater than 70% of the width Wo, stiffness of the inner shoulder land portion 4B is reduced and the groove volume is increased, so that steering stability and noise performance may not be improved by the tire 1.

An angle θ3 of the inner lateral groove 8 relative to the tire axial direction at the terminating position in the inner shoulder land portion 4B is preferably 0 to 20°. The inner lateral groove 8 having such a structure can allow stiffness, in the tire axial direction, of the inner shoulder land portion 4B to be improved, and can also have a reduced groove volume, thereby allowing steering stability and noise performance to be improved by the tire 1.

Figure 4:
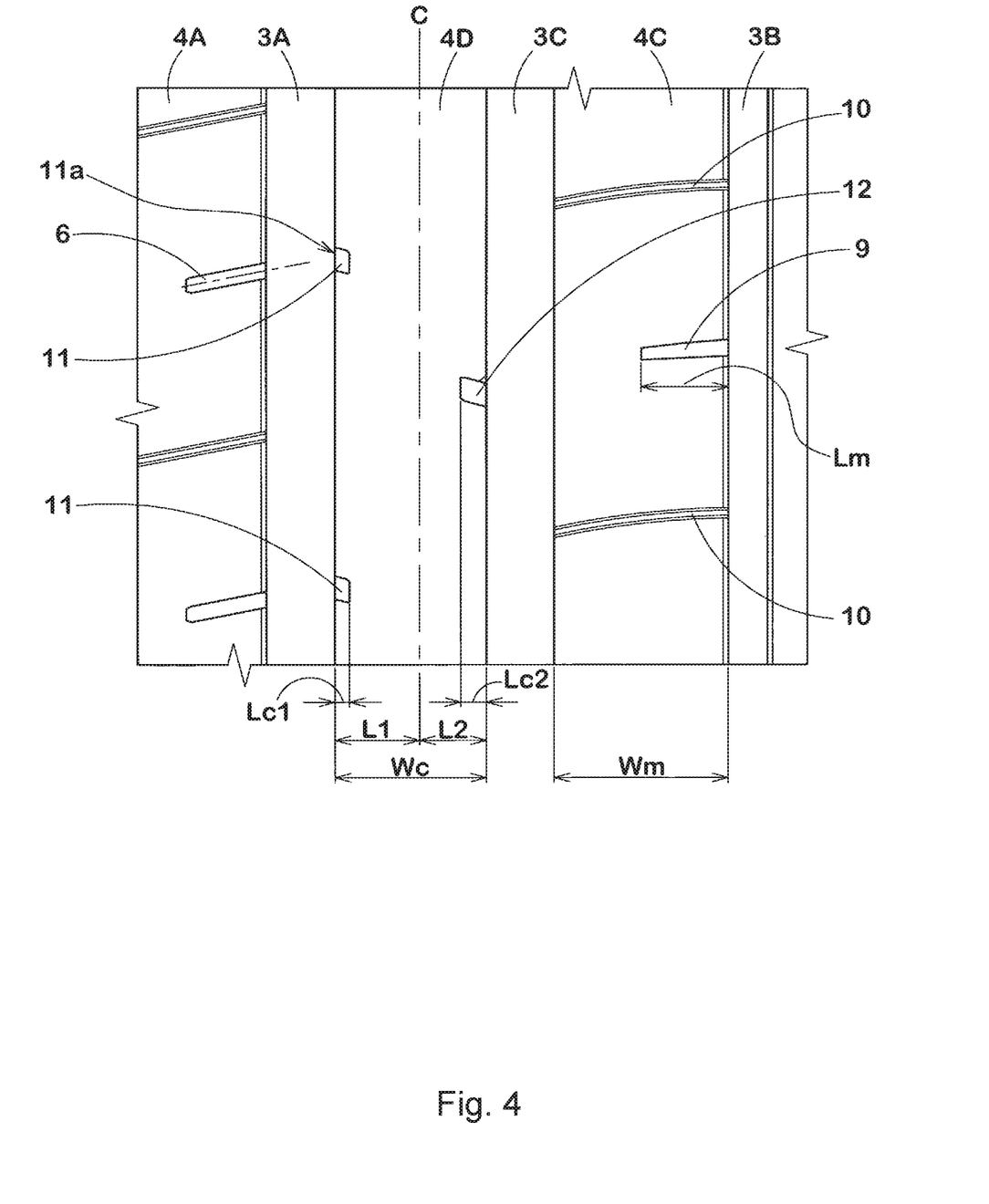
FIG. 4 is an enlarged development of a middle land portion and a crown land portion.

FIG. 4 is an enlarged development of the middle land portion 4C and the crown land portion 4D. As shown in FIG. 4, the middle land portion 4C preferably has middle lateral grooves 9 that extend inward from the first inner circumferential groove 3B in the tire axial direction and terminate in the middle land portion 4C. The middle lateral grooves 9 having such a structure can allow stiffness of the middle land portion 4C to be in an appropriate range, and allow well-balanced improvement of steering stability, ride comfort, and noise performance to be achieved by the tire 1.

A length Lm, in the tire axial direction, of each middle lateral groove 9 is preferably 40% to 60% of the width Wm of the middle land portion 4C. When the length Lm is less than 40% of the width Wm, stiffness of the middle land portion 4C becomes excessively high, and ride comfort provided by the tire 1 may be degraded. When the length Lm is greater than 60% of the width Wm, stiffness of the middle land portion 4C is reduced and the groove volume is increased, so that steering stability and noise performance may not be improved by the tire 1.

The middle land portion 4C preferably has middle sipes 10 that continuously extend from the first inner circumferential groove 3B to the second inner circumferential groove 3C. For example, the middle sipes 10 and the middle lateral grooves 9 alternate in the tire circumferential direction. The middle sipes 10 having such a structure can allow stiffness of the middle land portion 4C to be in an appropriate range, and allow both steering stability and ride comfort to be achieved by the tire 1.

In the crown land portion 4D, a first length L1, in the tire axial direction, of a region closer to the outer circumferential groove 3A than the tire equator C is preferably greater than a second length L2, in the tire axial direction, of a region closer to the second inner circumferential groove 3C than the tire equator C. The crown land portion 4D having such a structure can allow stiffness to become high on the outer side of the vehicle, and allow cornering power during cornering to be improved, so that steering stability can be further improved by the tire 1.

A difference (L1−L2) between the first length L1 and the second length L2 is preferably 20% to 80% of the width Wc of the crown land portion 4D. When the difference (L1−L2) is less than 20% thereof, stiffness of the outer shoulder land portion 4A becomes excessively high, and ride comfort provided by the tire 1 may be degraded. When the difference (L1−L2) is greater than 80% thereof, stiffness of the outer shoulder land portion 4A is reduced, and steering stability may not be improved by the tire 1.

The crown land portion 4D preferably includes first crown lateral grooves 11 that extend inward from the outer circumferential groove 3A in the tire axial direction, and terminate in the crown land portion 4D. For example, the first crown lateral grooves 11 extend linearly. The first crown lateral grooves 11 having such a structure can allow stiffness of the crown land portion 4D to be regulated, and allow steering stability to be improved by the tire 1.

In the present embodiment, an opening 11a of each first crown lateral groove 11 to the outer circumferential groove 3A is disposed on the extension of the second outer lateral groove 6. The first crown lateral groove 11 is preferably tilted relative to the tire axial direction in the direction opposite to the direction of the second outer lateral groove 6. The first crown lateral grooves 11 having such a structure and the second outer lateral grooves 6 can allow stiffness on the outer side of the vehicle to be in an appropriate range, and allow well-balanced improvement of steering stability, ride comfort, and noise performance to be achieved by the tire 1.

A length Lc1, in the tire axial direction, of the first crown lateral groove 11 is preferably 10% to 30% of the first length L1. When the length Lc1 is less than 10% of the first length L1, stiffness of the crown land portion 4D may not be regulated and steering stability may not be improved by the tire 1. When the length Lc1 is greater than 30% of the first length L1, stiffness of the crown land portion 4D is reduced and the groove volume is increased, so that steering stability and noise performance may not be improved by the tire 1.

The crown land portion 4D of the present embodiment includes second crown lateral grooves 12 that extend inward from the second inner circumferential groove 3C in the tire axial direction, and terminate in the crown land portion 4D. For example, the second crown lateral grooves 12 and the first crown lateral grooves 11 alternate in the tire circumferential direction. The second crown lateral grooves 12 having such a structure and the first crown lateral grooves 11 can allow stiffness of the crown land portion 4D to be in an appropriate range, and allow well-balanced improvement of steering stability, ride comfort, and noise performance to be achieved by the tire 1.

A length Lc2, in the tire axial direction, of the second crown lateral groove 12 is preferably 30% to 50% of the second length L2. When the length Lc2 is less than 30% of the second length L2, stiffness of the crown land portion 4D may not be regulated, and steering stability may not be improved by the tire 1. When the length Lc2 is greater than 50% of the second length L2, stiffness of the crown land portion 4D is reduced and the groove volume is increased, so that steering stability and noise performance may not be improved by the tire 1.

Although the preferred embodiments of the present invention have been described above in detail, the present invention is not limited to the embodiments described above, and various modifications can be devised to implement the present invention.

EXAMPLES

A sample of a pneumatic tire having a basic pattern shown in FIG. 1 was produced based on the specifications indicated in Table 1. The tires produced as the samples were mounted to all the wheels of a test vehicle, and steering stability and ride comfort were evaluated. Specifications common to the sample tires and a test method were as follows.

<Common Specifications>
Test vehicle: four-wheel-drive vehicle, as a passenger car, having an engine displacement of 3.8 liters
Size of tire for front wheel: 255/40R20
Size of tire for rear wheel: 285/35R20
Size of rim for front wheel: 20×10J
Size of rim for rear wheel: 20×10.5J
Air pressure for front wheel: 210 kPa
Air pressure for rear wheel: 200 kPa
<Steering Stability>
One test driver got in the test vehicle and drove on a circuit test course, and the test driver made sensory evaluation for responsiveness of the vehicle to steering at a low speed (40 to 80 km/h) and a high speed (100 to 120 km/h). The results are indicated as indexes with the index of comparative example being 100. The greater the value of the index is, the more excellent steering stability is.
<Ride Comfort>
One test driver got in the test vehicle and drove on a test course of a road under vibration, and the test driver made sensory evaluation for ride comfort at 40 km/h. The results are indicated as indexes with the index of comparative example being 100. The greater the value of the index is, the more excellent ride comfort is.

The test results are indicated in Table 1.

According to the test results, it is confirmed that the tires of examples allowed steering stability to be improved while maintaining ride comfort which was equivalent to or better than that in the comparative example, and allowed achievement of both steering stability and ride comfort.

What is claimed is:
1. A tire comprising:
a tread portion having an asymmetric tread pattern and a designated mounting direction to a vehicle,
wherein the tread portion has an outer tread end that is positionable on an outer side of the vehicle when mounted to the vehicle, an inner tread end that is positionable on an inner side of the vehicle when mounted to the vehicle, a tire equator between the outer tread end and the inner tread end, a plurality of circumferential grooves that extend continuously in a tire circumferential direction, and a plurality of land portions that are defined by the circumferential grooves,
wherein the plurality of circumferential grooves includes an outer circumferential groove extending in a region between the outer tread end and the tire equator,
wherein the plurality of land portions includes an outer shoulder land portion defined to continuously extend between the outer circumferential groove and the outer tread end in a tire axial direction, and to have a largest width in the tire axial direction of the plurality of land portions,
wherein the outer shoulder land portion has at least one first outer lateral groove extending inwardly from the outer tread end in the tire axial direction and terminating in the outer shoulder land portion at a terminating position,
wherein an angle of the at least one first outer lateral groove relative to the tire axial direction at the terminating position in the outer shoulder land portion is 0 to 20°,
wherein the plurality of circumferential grooves further includes a first inner circumferential groove extending adjacent to the inner tread end in a region between the inner tread end and the tire equator,
wherein the plurality of land portions further includes an inner shoulder land portion defined between the first inner circumferential groove and the inner tread end,
wherein the plurality of circumferential grooves further includes a second inner circumferential groove extending in a region between the inner tread end and the tire equator,
wherein the plurality of land portions further includes a crown land portion defined between the outer circumferential groove and the second inner circumferential groove,

TABLE 1

| | Comp. Ex. | Example 1 | Example 2 | Example 3 | Example 4 | Example 5 | Example 6 | Example 7 | Example 8 | Example 9 |
|---|---|---|---|---|---|---|---|---|---|---|
| Angle θ1(°) of first outer lateral groove | 45 | 10 | 10 | 10 | 10 | 10 | 10 | 10 | 10 | 10 |
| First outer lateral groove length Lo1/outer land portion width Wo (%) | 100 | 35 | 40 | 50 | 60 | 65 | 50 | 50 | 50 | 50 |
| (First length L1-second length L2)/crown land portion width Wc (%) | 40 | 40 | 40 | 40 | 40 | 40 | 10 | 20 | 80 | 90 |
| Steering stability (index) | 100 | 125 | 122 | 120 | 110 | 105 | 105 | 115 | 110 | 105 |
| Ride comfort (index) | 100 | 100 | 104 | 106 | 106 | 107 | 108 | 107 | 104 | 101 | wherein the crown land portion includes an outer region between the outer circumferential groove and the tire equator, and an inner region between the second inner circumferential groove and the tire equator, wherein a first length of the outer region in the tire axial direction is greater than a second length of the inner region in the tire axial direction, wherein the crown land portion includes grooves in the outer region that each terminate in the crown land portion, and grooves in the inner region that each terminate in the crown land portion, wherein the grooves in the outer region and the grooves in the inner region are disposed without being separated by any circumferential groove therebetween, wherein a first ratio of a groove length in the tire axial direction of one of the grooves in the outer region relative to the first length is 10% to 30%, wherein a second ratio of a groove length in the tire axial direction of one of the grooves in the inner region relative to the second length is 30% to 50%, wherein the second ratio is greater than the first ratio, wherein the inner shoulder land portion has at least one inner lateral groove extending inwardly from the inner tread end in the tire axial direction and terminating in the inner shoulder land portion, and wherein a groove width of the outer circumferential groove and a groove width of the second inner circumferential groove are each greater than a groove width of the first inner circumferential groove.

2. The tire according to claim 1, wherein a difference between the first length and the second length is 20% to 80% of a width of the crown land portion.

3. The tire according to claim 1, wherein the outer shoulder land portion further has at least one second outer lateral groove extending outwardly from the outer circumferential groove in the tire axial direction and terminating in the outer shoulder land portion.

4. The tire according to claim 1, wherein the outer shoulder land portion further has outer sipes that connect respectively between a plurality of the first outer lateral grooves and the outer circumferential groove.

5. The tire according to claim 1, wherein a length, in the tire axial direction, of each inner lateral groove is 50% to 70% of a width of the inner shoulder land portion.

6. The tire according to claim 1, wherein the inner shoulder land portion is free of grooves and sipes continuously extending in the tire circumferential direction.

7. The tire according to claim 1,
wherein the at least one inner lateral groove terminates in the inner shoulder land portion at a second terminating position, and
an angle of the at least one inner lateral groove relative to the tire axial direction at the second terminating position in the inner shoulder land portion is 0 to 20°.

8. The tire according to claim 1, wherein the outer shoulder land portion further has at least one second outer lateral groove extending outwardly from the outer circumferential groove in the tire axial direction and terminating in the outer shoulder land portion, and
an entirety of the at least one second outer lateral groove extends straight in a direction that forms an angle from 0 to 20° with respect to the tire axial direction.

9. The tire according to claim 1, wherein the outer shoulder land portion further has at least one second outer lateral groove extending outwardly from the outer circumferential groove in the tire axial direction and terminating in the outer shoulder land portion, and the at least one second outer lateral groove extends at an angle with respect to the tire axial direction that is equal to the angle of the at least one first outer lateral groove relative to the tire axial direction.

10. The tire according to claim 1, further comprising a middle land portion having middle lateral grooves extending inwardly from the first inner circumferential groove in the tire axial direction and terminating in the middle land portion.

11. The tire according to claim 10, wherein the middle land portion further has middle sipes continuously extending from the first inner circumferential groove to a second inner circumferential groove arranged between the first inner circumferential groove and the tire equator.

12. The tire according to claim 1, wherein the outer shoulder land portion further has at least one second outer lateral groove extending outwardly from the outer circumferential groove in the tire axial direction and terminating in the outer shoulder land portion,
wherein the grooves in the outer region include at least one first crown lateral groove extending inwardly from the outer circumferential groove in the tire axial direction, and terminating in the crown land portion, and grooves in the inner region include at least one second crown lateral groove extending inwardly from the second inner circumferential groove in the tire axial direction, and terminating in the crown land portion,
wherein an opening of the at least one first crown lateral groove to the outer circumferential groove is disposed on an extension of the second outer lateral groove,
wherein the at least one first crown lateral groove is tilted relative to the tire axial direction in a direction opposite to direction of the at least one second outer lateral groove, and
wherein the at least one first crown lateral groove and the at least one second crown lateral groove are disposed at different circumferential positions from one another along the tire circumferential direction.

13. The tire according to claim 12, wherein a length in the tire axial direction of the at least one first crown lateral groove is 10% to 30% of the first length, and
wherein a length in the tire axial direction of the at least one second crown lateral groove is 30% to 50% of the second length.

14. A tire comprising:
a tread portion having an asymmetric tread pattern and a designated mounting direction to a vehicle,
wherein the tread portion has an outer tread end that is positionable on an outer side of the vehicle when mounted to the vehicle, an inner tread end that is positionable on an inner side of the vehicle when mounted to the vehicle, a tire equator between the outer tread end and the inner tread end, a plurality of circumferential grooves that extend continuously in a tire circumferential direction, and a plurality of land portions that are defined by the circumferential grooves,
wherein the plurality of circumferential grooves includes an outer circumferential groove extending in a region between the outer tread end and the tire equator,
wherein the plurality of land portions includes an outer shoulder land portion defined to continuously extend between the outer circumferential groove and the outer tread end in a tire axial direction, and to have a largest width in the tire axial direction of the plurality of land portions,
wherein the outer shoulder land portion has at least one first outer lateral groove extending inwardly from the outer tread end in the tire axial direction and terminating in the outer shoulder land portion at a terminating position,
wherein an angle of the at least one first outer lateral groove relative to the tire axial direction at the terminating position in the outer shoulder land portion is 0 to 20°,
wherein the outer shoulder land portion further has at least one second outer lateral groove extending outwardly from the outer circumferential groove in the tire axial direction and terminating in the outer shoulder land portion,
wherein the at least one second outer lateral groove has a length, in the tire axial direction, that is 25% to 75% of a difference between a width of the outer shoulder land portion and length, in the tire axial direction, of the at least one first outer lateral groove,
wherein the plurality of circumferential grooves further includes a first inner circumferential groove extending adjacent to the inner tread end in a region between the inner tread end and the tire equator,
wherein the plurality of land portions further includes an inner shoulder land portion defined between the first inner circumferential groove and the inner tread end,
wherein the plurality of circumferential grooves further includes a second inner circumferential groove extending in a region between the inner tread end and the tire equator,
wherein the plurality of land portions further includes a crown land portion defined between the outer circumferential groove and the second inner circumferential groove,
wherein the crown land portion includes an outer region between the outer circumferential groove and the tire equator, and an inner region between the second inner circumferential groove and the tire equator,
wherein a first length of the outer region in the tire axial direction is greater than a second length of the inner region in the tire axial direction,
wherein the crown land portion includes grooves in the outer region that each terminate in the crown land portion, and grooves in the inner region that each terminate in the crown land portion,
wherein the grooves in the outer region and the grooves in the inner region are disposed without being separated by any circumferential groove therebetween,
wherein a first ratio of a groove length in the tire axial direction of one of the grooves in the outer region relative to the first length is 10% to 30%,
wherein a second ratio of a groove length in the tire axial direction of one of the grooves in the inner region relative to the second length is 30% to 50%,
wherein the second ratio is greater than the first ratio, and
wherein a groove width of the outer circumferential groove and a groove width of the second inner circumferential groove are each greater than a groove width of the first inner circumferential groove.

15. The tire according to claim 14,
wherein the grooves in the outer region include at least one first crown lateral groove extending inwardly from the outer circumferential groove in the tire axial direction, and terminating in the crown land portion, and
wherein an opening of the at least one first crown lateral groove to the outer circumferential groove is disposed on an extension of the second outer lateral groove.

16. The tire according to claim 15, wherein the at least one first crown lateral groove is tilted relative to the tire axial direction in a direction opposite to direction of the at least one second outer lateral groove.

17. A tire comprising:
a tread portion having an asymmetric tread pattern and a designated mounting direction to a vehicle,
wherein the tread portion has an outer tread end that is positionable on an outer side of the vehicle when mounted to the vehicle, an inner tread end that is positionable on an inner side of the vehicle when mounted to the vehicle, a tire equator between the outer tread end and the inner tread end, a plurality of circumferential grooves that extend continuously in a tire circumferential direction, and a plurality of land portions that are defined by the circumferential grooves,
wherein the plurality of circumferential grooves includes an outer circumferential groove extending in a region between the outer tread end and the tire equator,
wherein the plurality of land portions includes an outer shoulder land portion defined to continuously extend between the outer circumferential groove and the outer tread end in a tire axial direction, and to have a largest width in the tire axial direction of the plurality of land portions,
wherein the outer shoulder land portion has at least one first outer lateral groove extending inwardly from the outer tread end in the tire axial direction and terminating in the outer shoulder land portion at a terminating position,
the outer shoulder land portion further includes at least one outer sipe that connects between the at least one first outer lateral groove and the outer circumferential groove,
wherein a first angle of a longitudinal central axis of the at least one first outer lateral groove relative to the tire axial direction at the terminating position in the outer shoulder land portion is 0 to 20°, and a vertex of the first angle is an end point of the at least one first outer lateral groove along the longitudinal central axis at the terminating position,
an entirety of the at least one outer sipe extends along a straight line and is disposed at an angle relative to the tire axial direction that is equal to the first angle,
wherein the plurality of circumferential grooves further includes a first inner circumferential groove extending adjacent to the inner tread end in a region between the inner tread end and the tire equator,
wherein the plurality of circumferential grooves further includes a second inner circumferential groove extending in a region between the inner tread end and the tire equator, and
wherein a groove width of the outer circumferential groove and a groove width of the second inner circumferential groove are each greater than a groove width of the first inner circumferential groove.

* * * * *